United States Patent
Maeta et al.

(10) Patent No.: US 8,215,189 B2
(45) Date of Patent: Jul. 10, 2012

(54) VEHICLE SEAT APPARATUS HAVING LOAD DETECTING DEVICE

(75) Inventors: Kenji Maeta, Kariya (JP); Koji Ito, Yatomi (JP); Muneto Inayoshi, Nagoya (JP); Kan Ichihara, Kariya (JP); Hiroyuki Fujii, Kariya (JP); Yoshimasa Asano, Kariya (JP); Naoka Kawajiri, Kariya (JP); Takeshi Kuwabara, Gifu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 319 days.

(21) Appl. No.: 12/618,006

(22) Filed: Nov. 13, 2009

(65) Prior Publication Data

US 2010/0127552 A1 May 27, 2010

(30) Foreign Application Priority Data

Nov. 21, 2008 (JP) ................................. 2008-297700

(51) Int. Cl.
*G01L 1/26* (2006.01)
(52) U.S. Cl. .................................................. 73/862.391
(58) Field of Classification Search ............ 73/862.381–862.391, 862.627
See application file for complete search history.

(56) References Cited

U.S. PATENT DOCUMENTS

| | | | |
|---|---|---|---|
| 6,231,076 B1 * | 5/2001 | Blakesley et al. ............. | 280/735 |
| 6,356,200 B1 * | 3/2002 | Hamada et al. ................ | 340/667 |
| 6,786,104 B1 | 9/2004 | Aoki | |
| 6,840,119 B2 | 1/2005 | Aoki | |
| 7,032,968 B2 * | 4/2006 | Sakai et al. ................. | 297/217.2 |
| 7,155,981 B2 | 1/2007 | Matsuura et al. | |
| 7,156,198 B2 * | 1/2007 | Nishide et al. ................ | 180/273 |
| 7,487,687 B2 | 2/2009 | Sumi et al. | |
| 7,490,523 B2 * | 2/2009 | Sakamoto et al. ....... | 73/862.391 |
| 7,555,960 B2 | 7/2009 | Nakano et al. | |
| 7,559,249 B2 | 7/2009 | Nakano et al. | |
| 2009/0064792 A1 | 3/2009 | Kawabata et al. | |
| 2009/0126500 A1 | 5/2009 | Ito et al. | |

FOREIGN PATENT DOCUMENTS

JP  2001-150997 A  6/2001

(Continued)

OTHER PUBLICATIONS

U.S. Appl. No. 12/628,777, filed Dec. 1, 2009, Ito et al.

(Continued)

*Primary Examiner* — Max Noori
(74) *Attorney, Agent, or Firm* — Buchanan Ingersoll & Rooney PC

(57) ABSTRACT

A seat apparatus for a vehicle, includes a seat-side fixing member, a slide rail, a load detecting device disposed between the seat-side fixing member and the slide rail and arranged at an end portion of the slide rail on a rear side of the vehicle, and a bracket arranged at an end portion of the slide rail on a front side of the vehicle, the bracket supporting the seat-side fixing member. The bracket includes a lower attachment portion attached to the slide rail, a supporting portion extending from the lower attachment portion toward an upper side of the vehicle, and an upper attachment portion connected to the supporting portion so as to extend from the supporting portion toward the rear side of the vehicle, thereby being cantilever-supported by the supporting portion, and attached to the seat-side fixing member at a free-end side of the upper attachment portion.

14 Claims, 7 Drawing Sheets

FOREIGN PATENT DOCUMENTS

| | | |
|---|---|---|
| JP | 2003-83707 A | 3/2003 |
| JP | 2008-132968 A | 6/2008 |
| JP | 2008-132969 A | 6/2008 |
| JP | 2008-134226 A | 6/2008 |
| JP | 2008-134232 A | 6/2008 |

OTHER PUBLICATIONS

U.S. Appl. No. 12/681,045, filed Nov. 13, 2009, Ito et al.
U.S. Appl. No. 12/618,045, filed Nov. 13, 2009, Ito et al.
U.S. Appl. No. 12/618,006, Nov. 13, 2009, Maeta et al.

* cited by examiner

VEHICLE SEAT APPARATUS HAVING LOAD DETECTING DEVICE

CROSS REFERENCE TO RELATED APPLICATIONS

This application is based on and claims priority under 35 U.S.C. §119 to Japanese Patent Application 2008-297700, filed on Nov. 21, 2008, the entire content of which is incorporated herein by reference.

TECHNICAL FIELD

This disclosure relates to a seat apparatus for a vehicle, having a load detecting device for detecting a load of an occupant seated on a seat for the vehicle.

BACKGROUND DISCUSSION

A seat apparatus for a vehicle is disclosed in, for example, JP2008-134232A. According to JP2008-134232A, a plurality of load detecting devices is arranged between a seat-side fixing member and a pair of upper rails that is slidable relative to a vehicle floor in a front-rear direction of the vehicle. More specifically, four load detecting devices are respectively arranged at front ends and rear ends of the pair of upper rails that are arranged to face each other in a left-right direction of the vehicle.

On the other hand, a device for measuring a weight of a seat is disclosed in JP2001-150997A, in which the number of load detecting devices is reduced in order to reduce a cost of manufacturing, assembling and wiring. According to JP2001-150997A, two load detecting devices are respectively arranged between a seat-side fixing member and rear ends of a pair of upper rails. Front ends of the pair of upper rails are respectively spot-fixed or pivotally connected to the seat-side fixing member. Thus, the number of load detecting devices is reduced.

According to configurations disclosed in JP2001-150997A, however, depending on an orientation of a vehicle driven downhill and on a posture and a seating position of an occupant, a load of the occupant, seated on the seat, may not be accurately detected. When the vehicle is driven downhill, a center of gravity of the occupant, seated on the seat, is positioned at a more forward side of the vehicle than a position of the center of gravity of the occupant while the vehicle is driven on a leveled road. Because the load detecting devices according to JP2001-150997A are arranged only at a rear end of the vehicle, a load received by the load detecting devices may be decreased. Further, a center of gravity of the occupant, seated at a front portion of the seat, is positioned at a more forward side of the vehicle than a position of the center of the gravity of the occupant, seated at a rear portion of the seat. In such a case also, a load received by the load detecting devices may be decreased.

A need thus exists for a seat apparatus for a vehicle, which is not susceptible to the drawback mentioned above.

SUMMARY

According to an aspect of this disclosure, a seat apparatus for a vehicle includes a seat-side fixing member adapted to fix a seat for the vehicle, a slide rail adapted to be arranged so as to be slidable relative to a floor of the vehicle in a front-rear direction of the vehicle, a load detecting device disposed between the seat-side fixing member and the slide rail and arranged at an end portion of the slide rail on a rear side of the vehicle, the load detecting device detecting a load of an occupant seated on the seat for the vehicle, and a bracket arranged at an end portion of the slide rail on a front side of the vehicle, the bracket supporting the seat-side fixing member relative to the slide rail. The bracket includes a lower attachment portion attached to an upper surface of the slide rail, a supporting portion extending from the lower attachment portion toward an upper side of the vehicle, and an upper attachment portion connected to the supporting portion so as to extend from the supporting portion toward the rear side of the vehicle, thereby being cantilever-supported by the supporting portion, and attached to the seat-side fixing member at a free-end side of the upper attachment portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a seat apparatus for a vehicle will be described hereinafter with reference to the attached drawings. Directions mentioned in the description, such as front, rear, left, right, upper and lower correspond to directions of the vehicle.

[First Embodiment]

(A Configuration of the Seat Apparatus for the Vehicle)

Figure 1:
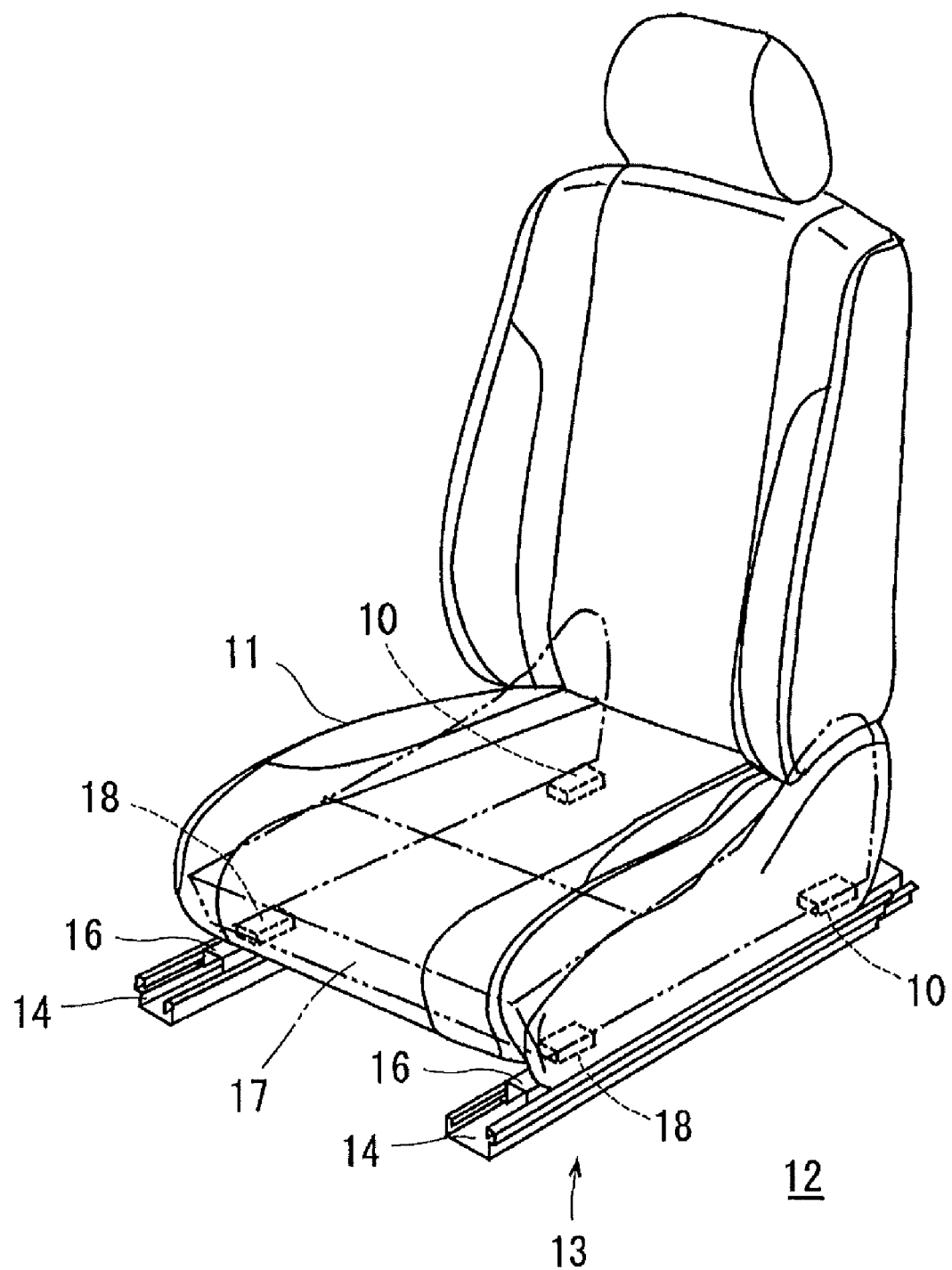
FIG. 1 is a perspective view illustrating a seat apparatus for a vehicle.
Figure 2:
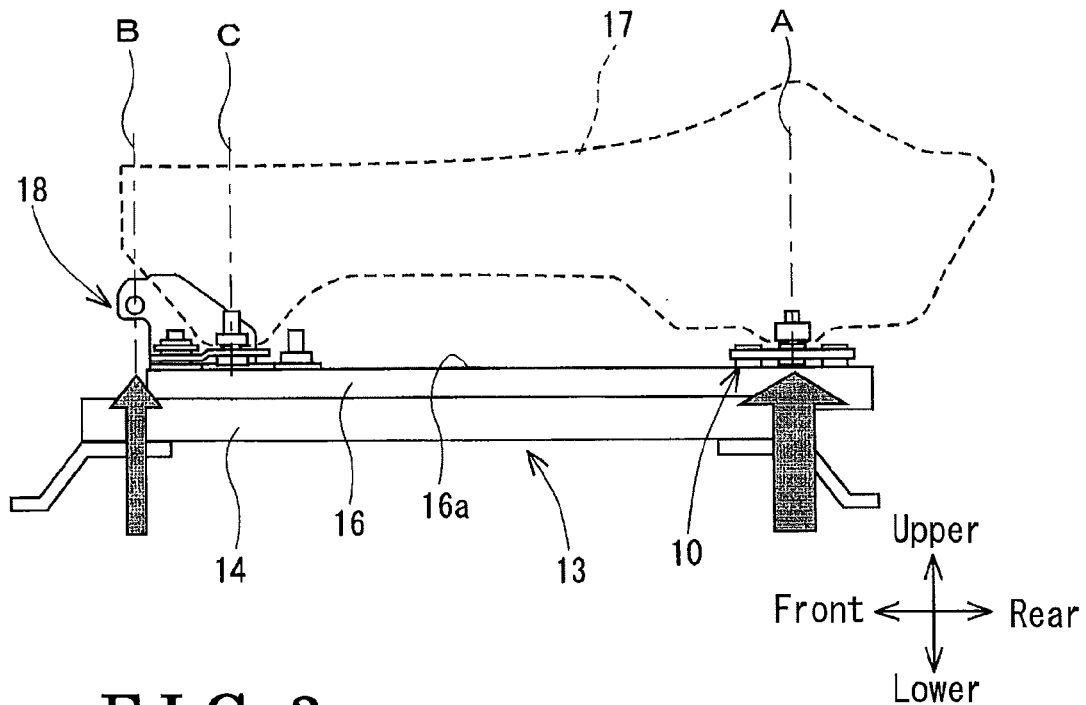
FIG. 2 is a side view illustrating a frame portion of the seat apparatus for the vehicle.

A configuration of the seat apparatus for the vehicle according to a first embodiment will be described with reference to FIGS. 1 and 2. FIG. 1 is a perspective view illustrating the seat apparatus for the vehicle. FIG. 2 is a side view illustrating a frame portion of the seat apparatus for the vehicle.

As illustrated in FIGS. 1 and 2, the seat apparatus for the vehicle includes a pair of seat slide devices 13, a seat frame 17 (a seat side fixing member), two load detecting devices 10, and two brackets 18.

The pair of seat slide devices 13 adjusts a position of a vehicle seat 11 (a seat for the vehicle) relative to a vehicle floor (a floor of the vehicle) and then fixes the position of the vehicle seat 11. The pair of seat slide devices 13 includes a pair of lower rails 14 and a pair of upper rails (a slide rail) 16. The pair of lower rails 14 is fixed at the vehicle floor 12 so as to extend in a front-rear direction of the vehicle in parallel with each other. The pair of lower rails 14 is spaced away from each other for a length that corresponds to a width of the vehicle seat 11 (a length of the vehicle seat 11 in a left-right direction of the vehicle). The pair of upper rails 16 is supported by the pair of lower rails 14 so as to be movable in the front-rear direction of the vehicle. A position of the pair of upper rails 16 relative to the pair of lower rails 14 is adjusted, and then the pair of upper rails 16 is locked into the pair of lower rails 14 by means of a lock mechanism at the adjusted position. A pair of fixing shafts for fixing each of the load detecting devices 10 is fixed at a rear end of a first attachment surface 16a, formed at an upper surface of each of the upper rails 16. The pair of fixing shafts protrudes in a substantially vertical direction of the vehicle so as to include a predetermined interval between each other in the front-rear direction of the vehicle. A pair of fixing shafts 19 (see FIGS. 5 to 8) for fixing each of the brackets 18 is fixed at a front end of the first attachment surface 16a. The pair of fixing shafts 19 protrudes in the substantially vertical direction of the vehicle so as to include a predetermined interval between each other in the front-rear direction of the vehicle.

The seat frame 17 supports a seating portion of the vehicle seat 11, on which an occupant is seated. A pair of reclining mechanisms of the vehicle seat 11 is arranged at a rear end of the seat frame 17. Left and right side surfaces of the seat frame 17 are bent in a direction where the side surfaces face each other, and thereby forming a substantially L shape. Bottom surfaces of the L-shaped surfaces of the seat frame 17 serve as second attachment surfaces 17a (see FIGS. 5 to 9), at which the load detecting devices 10 and the brackets 18 are attached. First connecting holes 17b (see FIG. 6) are respectively formed at front and rear ends of each of the second attachment surfaces 17a. A connecting shaft of each of the load detecting devices 10 and a connecting shaft 50 (a second fixing member) of each of the brackets 18 are respectively inserted through the first connecting holes 17b.

The load detecting devices 10 detect a load of the occupant seated on the vehicle seat 11. The load detecting devices 10 are arranged between the first attachment surfaces 16a of the upper rails 16 and the second attachment surfaces 17a of the seat frame 17 so that the seat frame 17 is supported by the load detecting devices 10 relative to the upper rails 16. More specifically, each of the load detecting devices 10 is attached at the rear end of the upper rail 16 and at the rear end of the seat frame 17. In other words, the load detecting devices 10 are arranged so that rear end corners of the second attachment surfaces (the bottom surface) 17a of the seat frame 17 are supported by the corresponding upper rails 16. A known load detecting device, disclosed, for example, in JP2008-134225, may be used as the load detecting devices 10.

The brackets 18 are arranged between the first attachment surfaces 16a of the upper rails 16 and the second attachment surfaces 17a of the seat frame 17 so that the seat frame 17 is supported by the brackets 18 relative to the upper rails 16. More specifically, each of the brackets 18 is attached at the front end of each of the upper rails 16 and at the front end of the seat frame 17. In other words, the brackets 18 are arranged so that front end corners of the second attachment surfaces (the bottom surface) 17a of the seat frame 17 are supported by the corresponding upper rails 16.

(Purpose of Applying the Bracket 18 According to the First Embodiment)

As described above, only two load detecting devices 10 are respectively arranged at the rear ends of the upper rails 16 while the front ends of the upper rails 16 are respectively provided with the brackets 18. In a case where only two load detecting devices 10 are provided, accuracy in load detection may be reduced, compared to a case where load detecting devices are respectively arranged at four corners of upper rails. Specifically because the load detecting devices 10 are arranged only at the corresponding rear ends of the upper rails 16, for example, in a case where the vehicle is driven downhill or where the occupant is seated on a front portion of the vehicle seat 11, the load detecting devices 10, arranged at the corresponding rear ends of the upper rails 16, may receive fewer loads.

Therefore, according to the first embodiment, the seat apparatus for the vehicle is configured so that the load detecting devices 10, arranged at the corresponding rear ends of the upper rails 16, receive a relatively large load, even when the vehicle is driven downhill or when the occupant is seated on a front portion of the vehicle seat 12, for example. More specifically, the brackets 18 cantilever-support the seat frame 17 in a manner where a first load supporting point B, at which the load of the seat frame 17 is supported by means of the brackets 18, is positioned at a more forward side of the vehicle than an attachment point C, at which the seat frame 17 is attached to the brackets 18. Further, a point, at which the load of the seat frame 17 is supported by means of the load detecting devices 10 serves as a second load supporting point A.

The more forward side of the vehicle the first load supporting point B by means of the brackets 18 is positioned, the more loads the load detecting devices 10 receives at the second load supporting point A. Therefore, even when the vehicle is driven downhill or when the occupant is seated on a front portion of the vehicle seat 12, for example, the load of the occupant may be detected surely only by means of two load detecting devices 10, arranged at the corresponding rear ends of the upper rails 16. A detailed configuration of the brackets 18 will be described hereinafter.

(Detailed Configuration of the Brackets 18)

Figure 3:
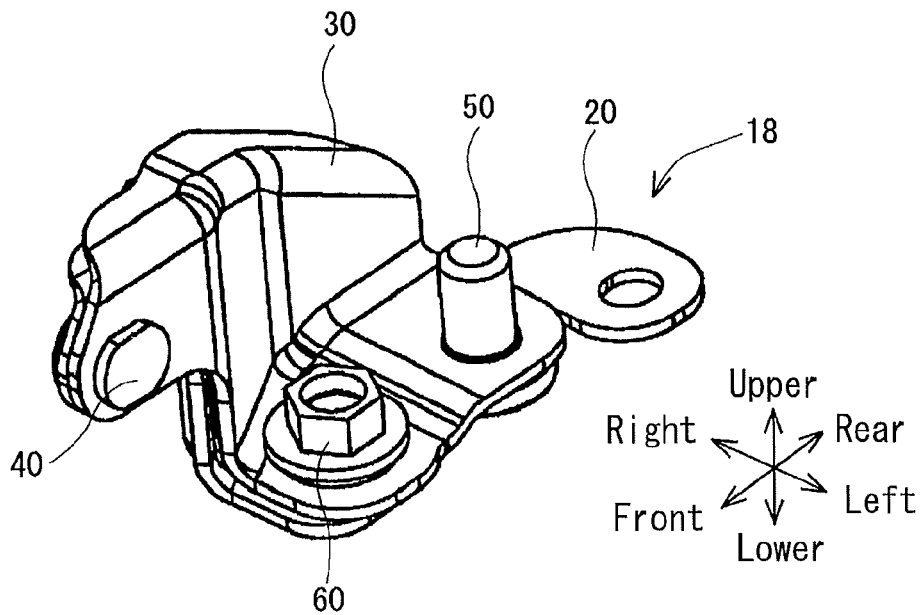
FIG. 3 is a perspective view illustrating a bracket according to a first embodiment.
Figure 4:
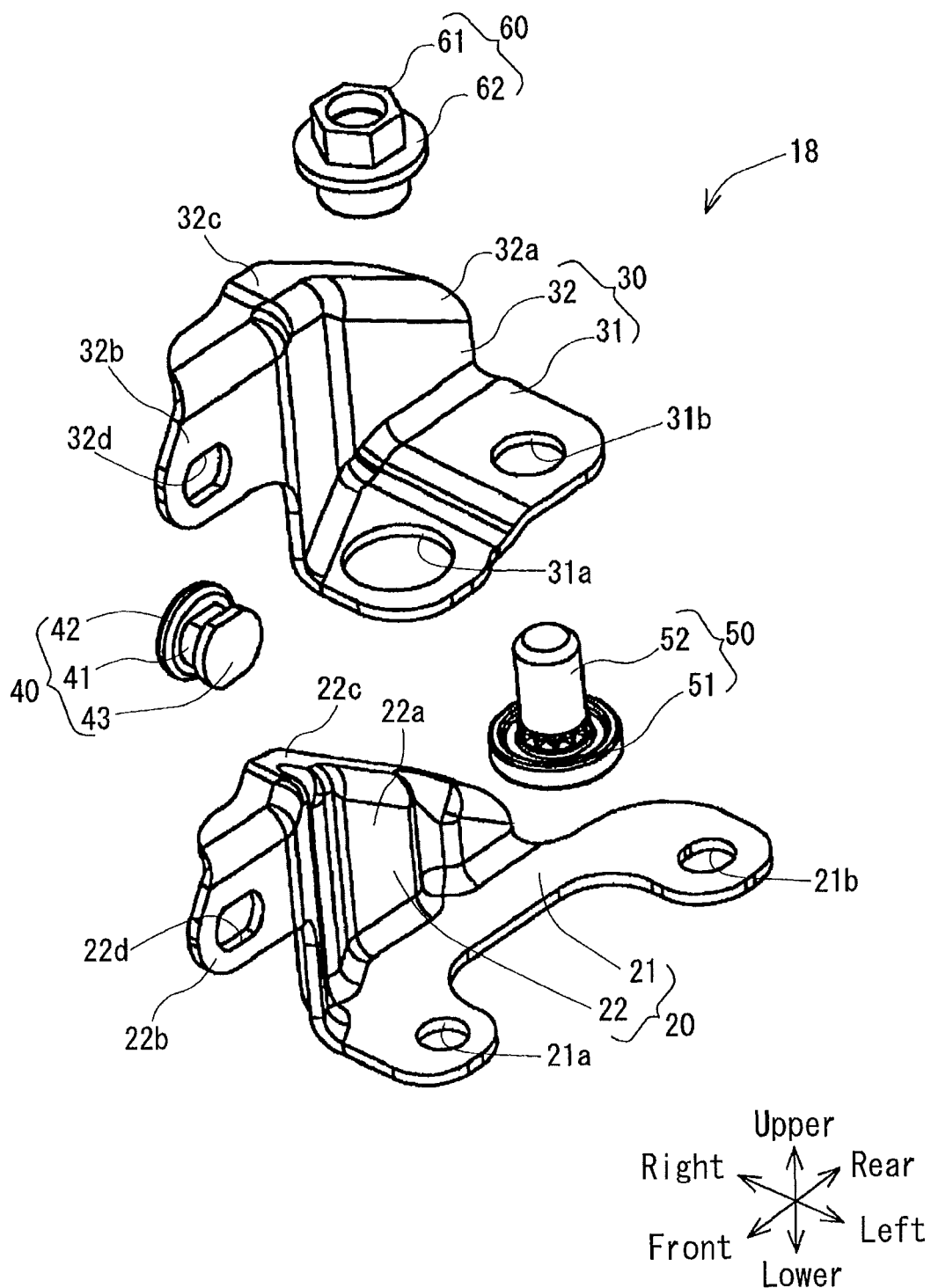
FIG. 4 is an exploded perspective view illustrating the bracket.
Figure 5:
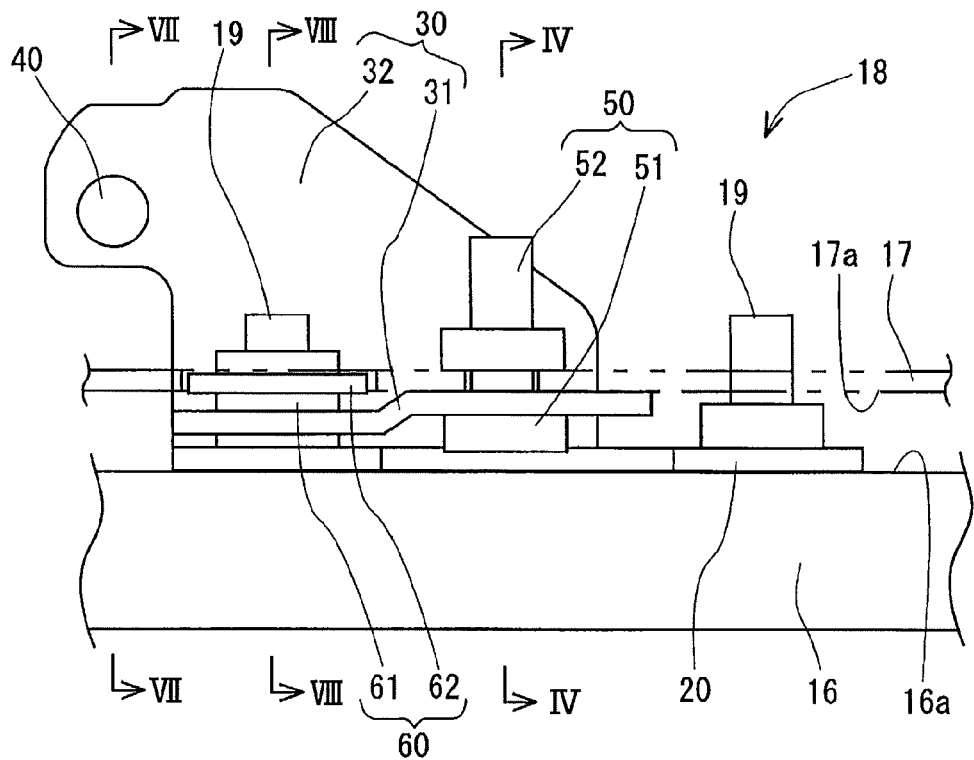
FIG. 5 is a side view illustrating the bracket.
Figure 6:
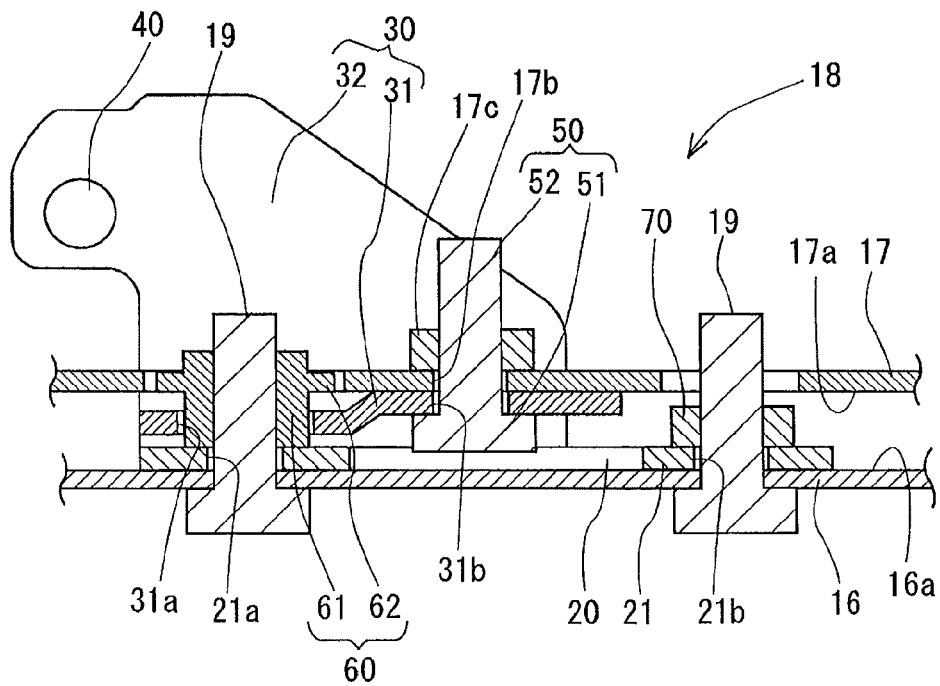
FIG. 6 is a cross-sectional view taken along line VI-VI in FIG. 7.
Figure 7:
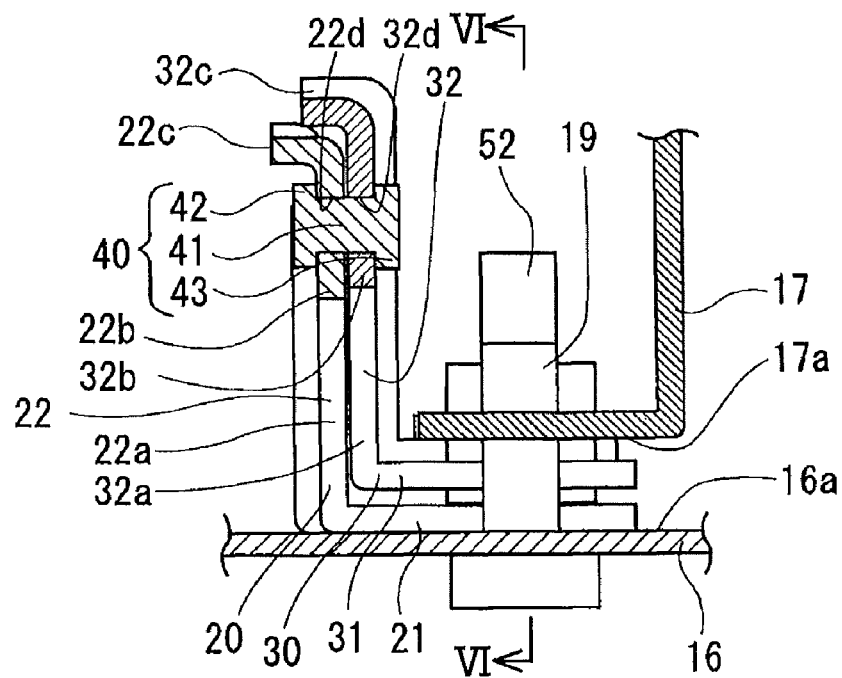
FIG. 7 is a cross-sectional view taken along line VII-VII in FIG. 5.
Figure 8:
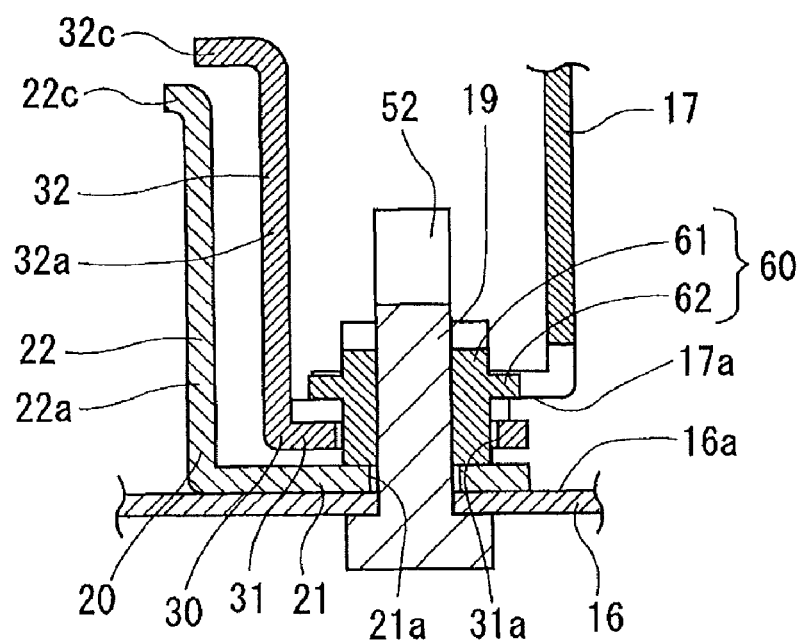
FIG. 8 is a cross-sectional view taken along line VIII-VIII in FIG. 5.
Figure 9:
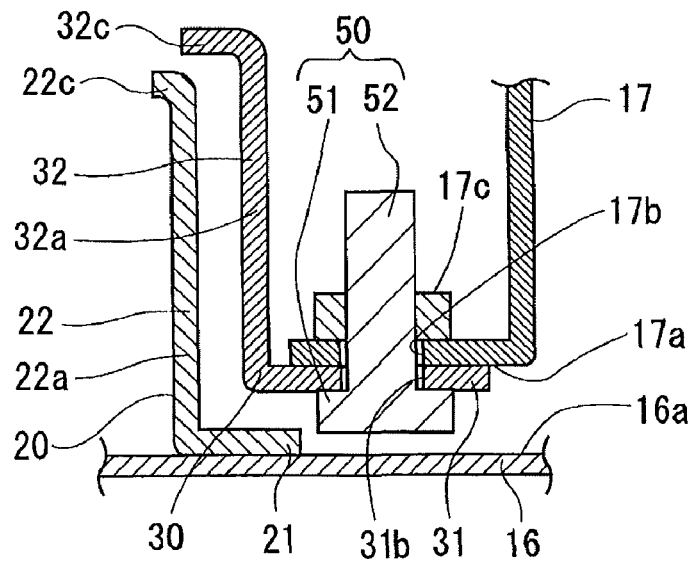
FIG. 9 is a cross-sectional view taken along line IX-IX in FIG. 5.

A detailed configuration of the brackets 18 will be described with reference to FIGS. 3 to 9. FIG. 3 is a perspective view illustrating one of the brackets 18. The bracket 18 shown in FIG. 3 is arranged at a front-left side of the vehicle seat 11 in FIG. 1. The bracket 18, arranged at a front-right side of the vehicle seat 11 in FIG. 1, is formed into a mirror-reversed shape of the bracket 18 shown in FIG. 3, arranged at the front-left side of the vehicle seat 11. FIG. 4 is an exploded perspective view illustrating one of the brackets 18. FIG. 5 is a side view illustrating one of the brackets 18. FIG. 6 is a cross-sectional view taken along line VI-VI in FIG. 7. FIG. 7 is a cross-sectional view taken along line VII-VII in FIG. 5. FIG. 8 is a cross-sectional view taken along line VIII-VIII in FIG. 5. FIG. 9 is a cross-sectional view taken along line IX-IX in FIG. 5. Structures and functions of the brackets 18, respectively arranged at the front-left side of the vehicle seat 11 and at the front-right side of the vehicle seat 11, are substantially the same. Therefore, one of the brackets 18, arranged at the front-left side of the vehicle seat 11 will be described in detail hereinafter as an example.

As illustrated in FIG. 4, the bracket 18 includes a first member 20, a second member 30, a connecting pin 40, the connecting shaft 50, a stopper nut (a first fixing member) 60, and a nut 70 (see FIG. 6).

The first member 20, as illustrated in FIGS. 5 and 6, is attached at the first attachment surface 16a of the upper rail 16. The first member 20 is formed into a substantially L shape (or a vertically inverted T shape) when seen from a front direction of the vehicle. More specifically, the first member 20 includes a lower attachment portion 21, which serves as a bottom surface of the L shape, and a supporting portion 22, which serves as a side wall of the L shape. The first member 20 is made of a steel plate, which is pressed so that the lower attachment portion 21 and the supporting portion 22 are integrally connected.

The lower attachment portion 21 is formed into a substantially planar shape. Further, the lower attachment portion 21 is formed into a substantially C shape, when seen from an upper direction of the vehicle, in which protruding portions respectively protrude from both longitudinal end portions of a plane portion of the lower attachment portion 21 in a direction substantially orthogonal relative to a longitudinal direction of the plane portion. A first attachment hole 21a and a second attachment hole 21b, each of which is formed into a substantially circular shape, are respectively formed at the protruding portions. The first and second attachment holes 21a and 21b are spaced away from each other for the same length as that of the interval between the pair of fixing shafts 19, which is arranged so as to protrude from the first attachment surface 16a of the upper rail 16. The fixing shafts 19 are respectively inserted through the first and second attachment holes 21a and 21b in a state where the protruding portions of the lower attachment portion 21 protrude in an outer direction of the pair of upper rails 16 (i.e. in a direction opposite from a direction where the pair of upper rails 16 face each other). The lower attachment surface 21 is arranged so as to overlap the first attachment surface 16a of the upper rail 16.

The supporting portion 22 is provided at a side of the plane portion of the lower attachment portion 21 opposite from a side where the protruding portions are formed, so that the supporting portion 22 extends from intermediate and front portions of the side of the plane portion of the lower attachment portion 21 in the front-rear direction of the vehicle, toward an upper side of the vehicle. The supporting portion 22 includes a first triangle portion 22a, a first forward extending portion 22b and a first strengthening flange 22c. The supporting portion 22 is formed into a substantially plane shape, which extends in the front-rear direction of the vehicle and in an upper-lower direction of the vehicle.

The first triangle portion 22a is formed into a substantially right-triangle shape. The side of the plane portion of the lower attachment portion 21 opposite from the side where the protruding portions are formed, is bent in the upper direction of the vehicle so that a right-angled base portion of the first triangle portion 22a is integrally formed with the lower attachment portion 21. An upper end of the first triangle portion 22a is formed to slant upwardly toward the front direction of the vehicle.

The first forward extending portion 22b extend from an upper portion of a front end of the first triangle portion 22a in the front direction of the vehicle so as to be substantially in parallel with the first triangle portion 22a. The first forward extending portion 22b is positioned to be slightly displaced relative to the first triangle portion 22a in the direction opposite from the direction where the pair of upper rails 16 face each other (in a left direction shown by an arrow in FIG. 4). A second connecting hole 22d, formed into a substantially elongated-circular shape, is formed at the first forward extending portion 22b so as to extend through the left-right direction of the vehicle. The second connecting hole 22d is positioned at a more forward side of the vehicle than the first and second attachment holes 21a and 21b. A distance between the second connecting hole 22d of the first forward extending portion 22b and the first attachment hole 21a of the lower attachment portion 21 in the front-rear direction of the vehicle is set to be larger than a distance between a front end of the upper rail 16 and one of the fixing shafts 19, which is arranged at the upper rail 16 to be at the more forward side of the vehicle than the other of the fixing shafts 19. The upper end of the first triangle portion 22a is bent in a direction opposite from the lower attachment portion 21 (in a right direction shown by an arrow in FIG. 4), and thereby the first strengthening flange 22c is integrally formed with the first triangle portion 22a.

As illustrated in FIGS. 5 and 6, the second member 30 is attached at the second attachment surface 17a of the seat frame 17. An entire shape of the second member is similar to the first member 20. The second member 30 is formed into a substantially L shape (or a vertically inverted T shape) when seen from the front direction of the vehicle. More specifically, the second member 30 includes an upper attachment portion 31, which serves as a bottom surface of the L shape, and a vertical wall portion 32, which serves as a side wall of the L shape. The second member 30 is made of a steel plate, which is pressed so that the upper attachment portion 31 and the vertical wall portion 32 are integrally connected.

The upper attachment portion 31 is formed into a substantially rectangular shape when seen from the upper direction of the vehicle. The upper attachment portion 31 includes a stepped portion at an intermediate portion between front and rear portions thereof in the front-rear direction of the vehicle. The front portion of the upper attachment portion 31 is positioned lower than the rear portion thereof. As illustrated in FIGS. 5 to 8, the front portion of the upper attachment portion 31 is arranged in parallel with an upper surface of the lower attachment portion 21 so as to include an interval therebetween. A circular-shaped engagement hole 31a, whose diameter is larger than that of the first attachment hole 21a of the lower attachment portion 21, is formed at the front portion of the upper attachment portion 31. The engagement hole 31a of the upper attachment portion 31 is positioned coaxially with the first attachment hole 21a of the lower attachment portion 21. The stopper nut 60 (described later) is inserted through the engagement hole 31a. As illustrated in FIGS. 6 to 9, the rear portion of the upper attachment portion 31 is positioned higher than a portion between the protruding portions of the lower attachment portion 21. In other words, the rear portion of the upper attachment portion 31 is arranged to be spaced away from the first attachment surface 16a of the upper rail 16. A circular-shaped third attachment hole 31b, whose diameter is smaller than that of the engagement hole 31a, is formed at the rear portion of the upper attachment portion 31. The third attachment hole 31b is positioned coaxially with the first connecting hole 17b of the seat frame 17.

The vertical wall portion 32 is arranged so as to protrude from a side of the upper attachment portion 31 toward the upper direction of the vehicle. The vertical wall portion 32 includes a second triangle portion 32a, a second forward extending portion 32b and a second strengthening flange 32c. The vertical wall portion 32 is formed into a substantially plane shape, which extends in the front-rear direction of the vehicle and in the upper-lower direction of the vehicle.

The second triangle portion 32a is formed into a substantially right-triangle shape. The side of the upper attachment portion 31 is bent in the upper direction of the vehicle so that a right-angled base portion of the second triangle portion 32a is integrally formed with the upper attachment portion 31. An upper end of the second triangle portion 32a is formed to slant upwardly toward the front direction of the vehicle. A width of the second triangle portion 32a of the vertical wall portion 32 in the front-rear direction of the vehicle is substantially the same as a width of the first triangle portion 22a of the supporting portion 22 in the front-rear direction of the vehicle. As illustrated in FIGS. 8 and 9, the second triangle portion 32a of the vertical wall portion 32 is arranged in parallel with the first triangle portion 22a of the supporting portion 22 so as to include an interval therebetween. With regard to the bracket 18, arranged at the front-left side of the vehicle, the second triangle portion 32a of the vertical wall portion 32 is arranged to include the interval at a left side (shown by the arrows in FIGS. 3 and 4) of the first triangle portion 22a of the supporting portion 22.

The second forward extending portion 32b extend from an upper portion of a front end of the second triangle portion 32a in the front direction of the vehicle so as to be substantially in parallel with the second triangle portion 32a. The second forward extending portion 32b is positioned to be slightly displaced relative to the second triangle portion 32a in the direction where the pair of upper rails 16 face each other (in the right direction shown by an arrow in FIG. 4). The second forward extending portion 32b is arranged to overlap the first forward extending portion 22b of the supporting portion 22 in a state where the second forward extending portion 32b contacts the first forward extending portion 22b (alternatively, in a state where the second forward extending portion 32b and the first forward extending portion 22b includes a slight interval therebetween). A third connecting hole 32d, formed into a substantially elongated-circular shape, is formed at the second forward extending portion 32b so as to extend through the left-right direction of the vehicle. The third connecting hole 32d and the second connecting hole 22d are formed into substantially the same shape. The third connecting hole 32d is positioned so as to correspond to a position of the second connecting hole 22d of the supporting portion 22. The third connecting hole 32d is positioned at a more forward side of the vehicle than the engagement hole 31a and the third attachment holes 31b of the upper attachment portion 31.

The upper end of the second triangle portion 32a is bent in a direction opposite from the upper attachment portion 31 (in the right direction shown by an arrow in FIG. 4), and thereby the second strengthening flange 32c is integrally formed with the second triangle portion 32a. The second strengthening flange 32c of the vertical wall portion 32 is positioned slightly higher than the first strengthening flange 22c of the supporting portion 22.

As illustrated in FIG. 7, the connecting pin (a connecting portion) 40 includes a shaft portion 41, formed at an intermediate portion of the connecting pin 40, and first and second flanges 42 and 43, which respectively extend from ends of the shaft portion 41 in a radially outer direction thereof. The shaft portion 41 of the connecting pin 40 is formed into a substantially elongated-circular shape so that the shaft portion 41 of the connecting pin 40 is inserted through the second and third connecting holes 22d and 32d and so that rotation of the connecting pin 40 relative to the second and third connecting holes 22d and 32d is restricted by an engagement between the shaft portion 41 of the connecting pin 40 and the second and third connecting holes 22d and 32d. The shaft portion 41 of the connecting pin 40 is inserted through the second and third connecting holes 22d and 32d. The first and second flanges 42 and 43, respectively formed at both ends of the shaft portion 41 of the connecting pin 40, engage with the corresponding first and second forward extending portions 22b and 32b in the vicinity of the second and third connecting holes 22d and 32d. The shaft portion 41 of the connecting pin 40 is inserted through the second and third connecting holes 22d and 32d so that the second flange 43 engages with the first forward extending portion 22b in the vicinity of the second connecting hole 22d, and then an end of the shaft portion 41 is riveted so as to form the first flange 42. Consequently, the connecting pin 40 integrally connects the first and second members 20 and 30. More specifically, the connecting pin 40 is arranged at the first forward extending portion 22b so that an axis of the connecting pin 40 extends in a direction orthogonal to a surface (a tangential direction) of the first triangle portion 22a of the supporting portion 22 and to a surface (a tangential direction) of the first forward extending portion 22b of the supporting portion 22. The connecting pin 40 axially supports the upper attachment portion 31 about the axis of the connecting pin 40 via the vertical wall portion 32.

The connecting shaft 50 connects the upper attachment portion 31 and the seat frame 17. The connecting shaft 50 includes a third flange 51 and a fixing screw portion 52. An outer diameter of the third flange 51 is set to be larger than an inner diameter of the third attachment hole 31b so that the third flange 51 engages with the upper attachment portion 31 in the vicinity of the third attachment hole 31b. An outer diameter of the fixing screw portion 52 of the connecting shaft 50 is set to be slightly smaller than an inner diameter of the third attachment hole 31b of the upper attachment portion 31 and than an inner diameter of the first connecting hole 17b of the seat frame 17. The fixing screw portion 52 is inserted through the third attachment hole 31b of the upper attachment portion 31 and through the first connecting hole 17b of the seat frame 17 from a lower direction of the vehicle so that the fixing screw portion 52 is screwed into a nut 17c. Consequently, the second member 30 and the seat frame 17 are fixed to each other. In other words, a position of the third attachment hole 31b serves as an attachment point (shown as C in FIG. 2) of the seat frame 17 relative to the bracket 18.

The stopper nut 60 includes a nut main body 61 and a stopper portion 62. The nut main body 61 is formed with a screw at an inner circumferential surface thereof. As illustrated in FIGS. 6 to 8, an outer diameter of the nut main body 61 is set to be larger than an inner diameter of the first attachment hole 21a of the lower attachment portion 21, but smaller than an inner diameter of the engagement hole 31a of the upper attachment portion 31. An upper portion of an outer circumferential surface of the nut main body 61 is formed into a substantially hexagonal shape. The stopper portion 62 is formed at an intermediate portion of the nut main body 61 in an axial direction of the nut main body 61. The stopper portion 62 extends from an entire outer circumference of the nut main body 61 in a radially outer direction of the nut main body 61. An outer diameter of the stopper portion 62 is set to be larger than the inner diameter of the engagement hole 31a of the upper attachment portion 31. The stopper nut 60 is arranged at the upper surface of the lower attachment portion 21 so that the fixing shaft 19, inserted through the first attachment hole 21a of the lower attachment portion 21, is screwed into the stopper nut 60. In other words, the stopper nut 60 fixes the first member 20 to the upper rail 16.

The stopper nut 60 in inserted into the engagement hole 31a of the upper attachment portion 31 from the upper direction of the vehicle. In other words, the stopper portion 62 is positioned higher than the front portion of the upper attachment portion 31. Further, a distance between a lower surface of the stopper portion 62 and a lower surface of the nut main body 61 is set to be larger than a distance between an upper surface of the front portion of the upper attachment portion 31 and the upper surface of the lower attachment portion 21. In other words, in a state where the stopper nut 60 is fixed at the fixing shaft 19, a clearance is generated between the lower surface of the stopper portion 62 and the upper surface of the front portion of the upper attachment portion 31. Accordingly, when a load separating the vehicle seat 11 from the vehicle floor 12 is applied to the vehicle seat 11, the second member 30 may be spaced away from the first member 20. However, the stopper portion 62 engages with the upper attachment portion 31 of the second member 30. Therefore, the second member 30 is restricted from being spaced away from the first member 20.

The nut 70 is arranged at the upper surface of the lower attachment portion 21 so that the fixing shaft 19, inserted through the second attachment hole 21b of the lower attachment portion 21, is screwed into the nut 70. In other words, the nut 70, as well as the stopper nut 62, fixes the first member 20 to the upper rail 16.

The bracket 18 is structured as described above. Accordingly, the lower attachment portion 31 is connected to the supporting portion 22 via the vertical wall portion 32 and the connecting pin 40 so as to extend from the upper portion of the supporting portion 22 toward the rear side of the vehicle. In other words, the upper attachment portion 31 is cantilever-supported by the supporting portion 22 so that a rear end of the upper attachment portion 31 becomes a free end. The upper attachment portion 31 is attached to the seat frame 17 so that a position where the upper attachment portion 31 is attached to the seat frame 17 is closer to the free end of the upper attachment portion 31 than the supporting portion 22 is.

Accordingly, a position of the second and third connecting holes 22d and 32d serves as the first load supporting point B (see FIG. 2), at which the load of the seat frame 17 is supported by the bracket 18. In other words, the first load supporting point B of the seat frame 17 by means of the bracket 18 is positioned at a more forward side of the vehicle than the attachment point C (see FIG. 2) of the seat frame 17 relative to the bracket 18.

As described above, the distance between the second connecting hole 22d of the supporting portion 22 of the first member 20 and the first attachment hole 21a of the lower attachment portion 21 in the front-rear direction of the vehicle is set to be larger than the distance between the front end of the upper rail 16 and one of the fixing shafts 19, which is arranged at the upper rail 16 to be the most forward side of the vehicle. In other words, the first load supporting point B is positioned at a more forward side of the vehicle than the front end of the upper rail 16.

The position of the second and third connecting holes 22d and 32d (i.e. the position of the first load supporting point B of the seat frame 17 by means of the bracket 18) is provided at a more forward side of the vehicle than the position of the first and second attachment holes 21a and 21b, at which the bracket 18 is attached to the upper rail 16.

According to the aforementioned bracket 18, as described in the section of "Purpose of applying the bracket 18 according to the first embodiment", the first load supporting point B of the seat frame 17 by means of the bracket 18 is surely positioned at the more forward side of the vehicle than the attachment point C of the seat frame 17 relative to the bracket 18. Accordingly, a load, received by the load detecting device 10, is increased. Consequently, even in a case where the vehicle is driven downhill or where the occupant is seated on a front portion of the vehicle seat 11, the load of the occupant may be surely detected only by means of the two load detecting devices 10, respectively arranged at the rear ends of the upper rails 16.

The second connecting hole 22d of the supporting portion 22 is positioned at a more forward side of the vehicle than the positions where the lower attachment portion 21 is attached to the upper rail 16. Consequently, even though a position of the front end of the upper rail 16 may be limited, the first load supporting point B by means of the bracket 18 is positioned at a more forward side of the vehicle. Therefore, a load, received by the load detecting device 10, is surely increased.

The second connecting hole 22d of the supporting portion 22 (i.e. a position where the supporting portion 22 supports the second member 30) is positioned at a more forward side of the vehicle than the front end of the upper rail 16. Consequently, even though a position of the front end of the upper rail 16 may be limited, the first load supporting point B by means of the bracket 18 is effectively positioned at a more forward side of the vehicle. Therefore, a load, received by the load detecting device 10, is further surely increased.

Both of the first triangle portion 22a and the first forward extending portion 22b of the supporting portion 22 extend in the front-rear direction of the vehicle and in the upper-lower direction of the vehicle. The supporting portion 22 is entirely formed into a substantially plane shape, which extends in the front-rear direction of the vehicle and in the upper-lower direction of the vehicle. Therefore, when the vehicle is suddenly accelerated or decelerated and a load is applied to the vehicle seat in the front-rear direction of the vehicle, the supporting portion 22 is applied mainly with shear stress, and thereby the supporting portion 22 may be deformed. Because a plane portion (a tangential direction of a plane portion) of the supporting portion 22 extends in the front-rear direction of the vehicle and in the upper-lower direction of the vehicle, a second moment of area may be increased. Therefore, the supporting portion 22 may obtain high flexural rigidity. Accordingly, the supporting portion 22 may obtain high supporting rigidity. Further, according to the first embodiment, the first strengthening flange 22c, extending in the direction opposite from the lower attachment portion 21 (i.e. in the right direction shown by the arrow in FIG. 4), is provided. Therefore, a second moment of area may be further increased.

The connecting pin 40 is arranged at the supporting portion 22 so that the axis of the connecting pin 40 extends in the direction orthogonal to the surface of the plate-shaped first triangle portion 22a of the supporting portion 22 and to the surface of the plate-shaped first forward extending portion 22b of the supporting portion 22. In other words, the connecting pin 40 axially supports the upper attachment portion 31 about the axis of the connecting pin 40.

The upper attachment portion 30 is cantilever-supported by the supporting portion 22. Therefore, when the occupant is seated on the vehicle seat 11 and the load is applied to the connecting pin 40 via the upper attachment portion 31, the load (a rotational load) is applied to the connecting pin 40 in a rotational direction about the axis of the connecting pin 40, and the rotational load is axially supported by the supporting portion 22. The axis of the connecting pin 40 extends orthogonally relative to the plate-shaped surfaces of the supporting portion 22 (i.e. the surfaces of the first triangle portion 22a and the first forward extending portion 22b). Therefore, the rotational load transmitted from the connecting pin 40 to the supporting portion 22 is applied tangentially relative to the surfaces of the first triangle portion 22a and the first forward extending portion 22b of the supporting portion 22. Accordingly, shear stress is applied to the supporting portion 22 to be in the rotational direction about the axis of the connecting pin 40 and to be in parallel with the surfaces of the first triangle portion 22a and the first forward extending portion 22b, and therefore, torsion force is less easily applied. Accordingly, the supporting portion 22 includes high supporting rigidity.

Likewise, both of the second triangle portion 32a and the second forward extending portion 32b of the vertical wall portion 32 are arranged so as to extend in the front-rear direction of the vehicle and in the upper-lower direction of the vehicle. Further, the connecting pin 40 axially supports the vertical wall portion 32 so that the axis of the connecting pin 40 extends in a direction orthogonal to the surfaces of the second triangle portion 32a and the second forward extending portion 32b of the vertical wall portion 32. Accordingly, the vertical wall portion 32, as well as the supporting portion 22, includes high supporting rigidity.

Further, as described above, the stopper nut 60 serves as a stopper relative to the load separating the vehicle seat 11 from the vehicle floor 12. Because the bracket 18 is configured so that the bracket 18 may be divided into the first member 20 and the second member 30, the bracket 18 itself may function as the stopper. Consequently, the first and second members 20 and 30 do not necessarily include a supporting rigidity relative to a load separating the vehicle seat 11 from the vehicle floor 12. Accordingly, weights of the first and second members 20 and 30 are reduced. As a result, a weight and a size of the bracket 18 are reduced.

The stopper nut 60 is a member for fixing the first member 20 to the upper rail 16. Such stopper nut 60 may also restrict the second member 30 from being separated from the first member 20. In other words, the stopper function may be performed without separately providing an additional stopper.

<Modified Embodiment of the First Embodiment>

According to the above-described first embodiment, the stopper nut 60 fixes the first member 20 to the upper rail 16 while engaging the second member 30. Alternatively, according to a modified embodiment of the first embodiment, a stopper member (corresponding to the connecting shaft 50) may be formed with a stopper portion (corresponding to the stopper portion 62 of the stopper nut 60). Further an engagement portion (corresponding to the engagement hole 31a of the upper attachment portion 30) may be formed at the lower attachment portion 21. In such a case, the stopper member fixes the second member 30 to the seat frame 17 while engaging the first member 20. Effects similar to the first embodiment may be obtained in the modified embodiment of the first embodiment.

[Second Embodiment]

Figure 10:
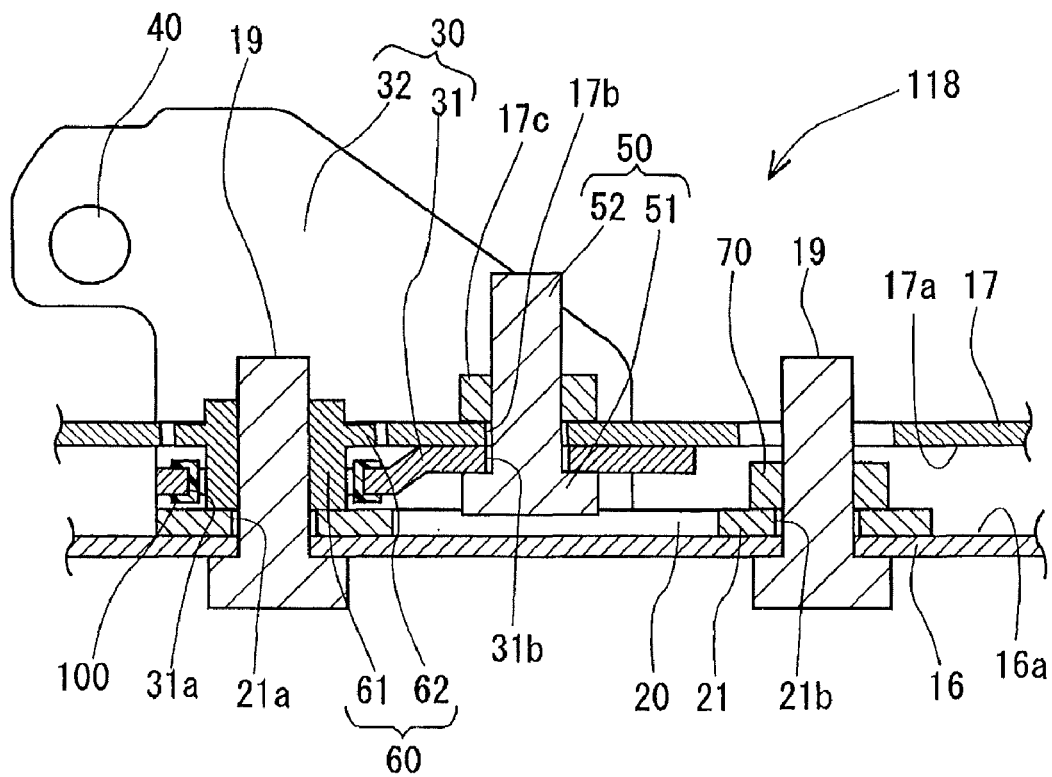
FIG. 10 is a cross-sectional view illustrating a bracket according to a second embodiment.

A bracket 118 according to a second embodiment will be described hereinafter with reference to FIG. 10. FIG. 10 is a cross-sectional view illustrating the bracket 118, corresponding to FIG. 6 according to the first embodiment. The bracket 118 according to the second embodiment differs from the bracket 18 according to the first embodiment in that the bracket 118 includes a resin bracket 100. Other configurations of the second embodiment are similar to the first embodiment. Therefore, the same reference numerals will be used to refer to the similar configurations, and detailed description of the similar configurations will be omitted.

The bracket 118 includes the resin bush 100, which engages with the engagement hole 31a of the upper attachment portion 31. The resin bush 100 is arranged at the inner circumferential surface of the engagement hole 31a of the upper attachment portion 31 and at upper and lower surfaces of the upper attachment portion 31 in the vicinity of the engagement hole 31a. In other words, the resin bush 100 functions as a buffer when the first and second members 20 and 30 are moved relative to each other in the upper-lower direction of the vehicle. Consequently, a direct contact between the upper attachment portion 31 of the second member 30 and the lower attachment portion 21 of the first member 20, and a direct contact between the upper attachment portion 31 and the stopper portion 62 of the stopper nut 60 may be restricted. Further, the resin bush 100 may be made of a material having a larger elasticity than materials of the first and second members 20 and 30 and the stopper nut 60. Furthermore, not only the resin bush 100, but also a member, having a different shape, may be applied, as long as the member restricts the aforementioned direct contact while functioning as a buffer.

[Third Embodiment]

Figure 11:
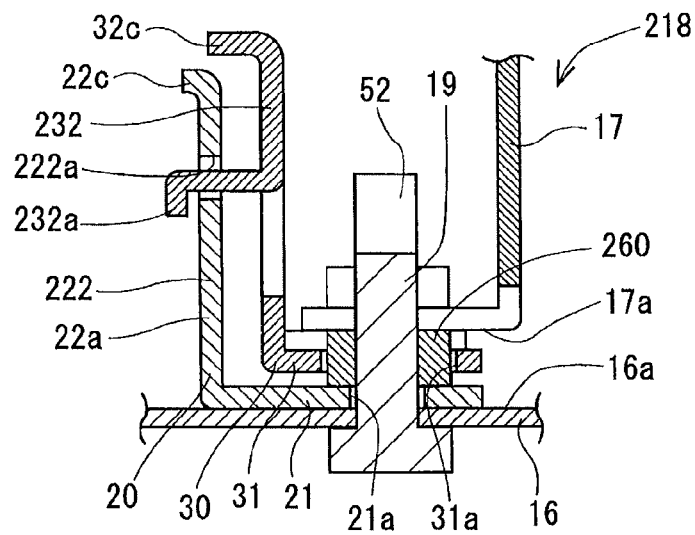
FIG. 11 is a cross-sectional view illustrating a bracket according to a third embodiment.

A bracket 218 according to a third embodiment will be described hereinafter with reference to FIG. 11. FIG. 11 (corresponding to FIG. 8 according to the first embodiment) is a cross-sectional view illustrating the bracket 218. A supporting portion 222 and a vertical wall portion 232 of the bracket 218 according to the third embodiment differs from the supporting portion 22 and the vertical wall portion 32 of the bracket 18 according to the first embodiment, respectively. Further, the stopper nut 60 according to the first embodiment is modified to a hexagonal nut 260 in the third embodiment. Other configurations of the third embodiment are similar to the first embodiment. Therefore, the same reference numerals will be used to refer to the similar configurations, and detailed description of the similar configurations will be omitted.

According to the bracket 18 of the first embodiment, the stopper nut 60 performs the stopper function. However, according to the bracket 218 of the third embodiment, the first second members 20 and 30 are shaped so that the first and second members 20 and 30 themselves perform the stopper function.

The supporting portion 222 (corresponding to the supporting portion 22 according the first embodiment) is formed with a stopper hole (a stopper portion) 222a at the first triangle portion 22a. The stopper hole 222a extends through the left-right direction of the vehicle. On the other hand, the vertical wall portion 232 (corresponding to the vertical wall portion 32 according to the first embodiment) is formed with an engagement portion 232a (a stopper portion) at the second triangle portion 32a. The engagement portion 232a protrudes in the left-right direction of the vehicle. The engagement portion 232a is inserted through the stopper hole 222a of the supporting portion 222 so as to engage therewith in the upper-lower direction of the vehicle. In other words, the stopper portion for performing the stopper function is integrally formed at the second member 30.

Accordingly, the stopper function may be performed without providing an additional member. Further, a hole may be formed at the second member 30 while an engagement portion may be formed at the first member 20. Furthermore, protruding portions may be integrally formed at the first and second members 20 and 30, respectively.

[Fourth Embodiment]

Figure 12:
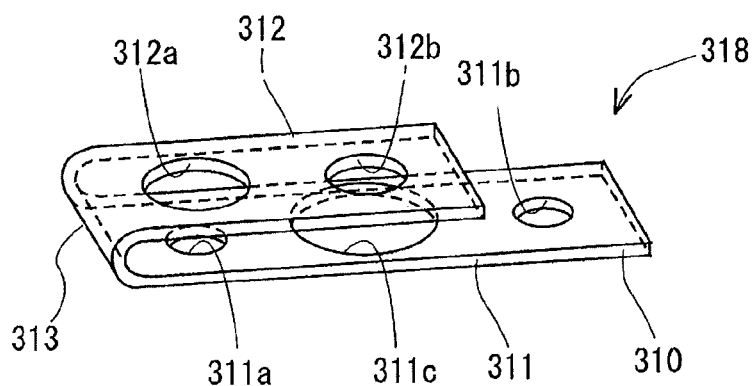
FIG. 12 is a perspective view illustrating a bracket according to a fourth embodiment.

A bracket 318 according to a forth embodiment will be described hereinafter with reference to FIG. 12. FIG. 12 is a perspective view illustrating the bracket 318 according to the fourth embodiment. The bracket 318 includes a bracket main body 310 (see FIG. 12), the connecting shaft 50, and two nuts. A configuration of the connecting shaft 50 is similar to the connecting shaft 50 according to the first embodiment.

The bracket main body 310 includes a lower attachment portion 311, an upper attachment portion 312 and a supporting portion 313. A steel plate is pressed so as to integrally form the bracket main body 310. The lower attachment portion 311 is formed into a substantially rectangular-shaped plate. A first attachment hole 311a and a second attachment hole 311b are respectively formed at ends of the lower attachment portion 311 in a longitudinal direction thereof. Further, a first relief hole 311c is formed at an intermediate portion between the first and second attachment holes 311a and 311b. An inner diameter of each of the first and second attachment holes 311a and 311b is set so that each of the fixing shafts 19, fixed at the upper rail 16 so as to protrude therefrom, is inserted through the first and second attachment holes 311a and 311b. An inner diameter of the first relief hole 311c is set to be larger than an outer diameter of the third flange 51 of the connecting shaft 50. The lower attachment portion 311 is arranged so as to overlap the first attachment surface 16a of the upper rail 16 so that the fixing shafts 19 are respectively inserted through the first and second attachment holes 311a and 311b. The fixing shafts 19 are respectively screwed into the nuts, thereby the lower attachment portion 311 is fixed to the first attachment surface 16a of the upper rail 16.

The upper attachment portion 312 is formed into a substantially rectangular-shaped plate. A second relief hole 312a is formed at a front portion of the upper attachment portion 312. A third attachment hole 312b is formed at a rear portion of the upper attachment portion 312. An inner diameter of the second relief hole 312a is set to be larger than an outer diameter of the nut, into which one of the fixing shafts 19 is screwed. An inner diameter of the third attachment hole 312b is set to be larger than the outer diameter of the fixing screw portion 52 of the connecting shaft 50, but to be smaller than the outer diameter of the third flange 51 of the connecting shaft 50. The upper attachment portion 312 is attached to the second attachment surface 17a of the seat frame 17 by means of the connecting shaft 50 and the nut.

The supporting portion 313 extends from a front end of the lower attachment portion 311 in the upper direction of the vehicle. Further, an upper end of the supporting portion 313 is connected to a front end of the upper attachment portion 312. In other words, the supporting portion 313 connects the front end of the lower attachment portion 311 to the front end of the upper attachment portion 312 in a manner where the lower and upper attachment portions 311 and 312 are spaced away from each other in the upper-lower direction of the vehicle. Accordingly, the lower and upper attachment portions 311 and 312 respectively protrude from a lower end and the upper end of the supporting portion 313 in the rear direction of the vehicle, and thereby the bracket 318 is entirely formed into a substantially C shape when seen from sides of the vehicle.

According to the bracket 318 of the fourth embodiment, a load supporting point, where the load of the seat frame 17 is supported by means of the bracket 318, is positioned at a more forward side of the vehicle than a first attachment point, where the bracket 318 is attached to the seat frame 17. Further, the load supporting point, where the load of the seat frame 17 is supported by means of the bracket 318, is positioned at a more forward side of the vehicle than a second attachment point, where the upper rail 16 is attached to the bracket 318. Accordingly, similar effects to the first embodiment may be obtained.

[Fifth Embodiment]

Figure 13:
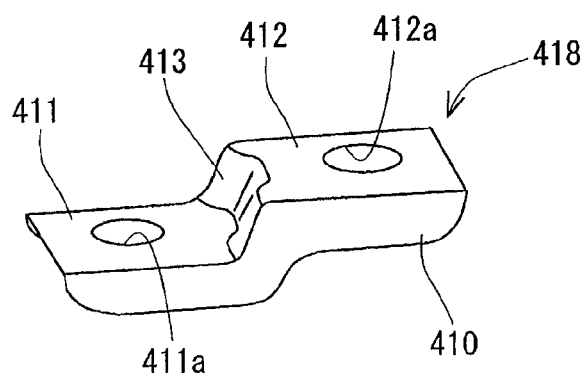
FIG. 13 is a perspective view illustrating a bracket according to a fifth embodiment.

A bracket 418 according to a fifth embodiment will be described hereinafter with reference to FIG. 13. FIG. 13 is a perspective view illustrating the bracket 418 according to the fifth embodiment. The bracket 418 includes a bracket main body 410 (see FIG. 13), the connecting shaft 50, and a nut. A configuration of the connecting shaft 50 is similar to the connecting shaft 50 according to the first embodiment.

The bracket main body 410 includes a lower attachment portion 411, an upper attachment portion 412 and a supporting portion 413. A steel plate is pressed so as to integrally form the bracket main body 410. The lower attachment portion 411 is formed into a substantially C shape when seen from the front direction of the vehicle, in which protruding portions respectively protrude from left and right ends of an upper surface of the lower attachment portion 411 in the lower direction of the vehicle. A circular-shaped first attachment hole 411a is formed at the upper surface of the lower attachment portion 411. An inner diameter of the attachment hole 411a is set so that the fixing shaft 19, fixed at the upper rail 16 so as to protrude therefrom, is inserted therethrough.

The upper attachment portion 412 is formed into a substantially C shape when seen from the front direction of the vehicle, in which protruding portions respectively protrude from left and right ends of an upper surface of the upper attachment portion 412 in the lower direction of the vehicle. A circular-shaped second attachment hole 412a is formed at the upper surface of the upper attachment portion 412. An inner diameter of the second attachment hole 412a is set to be larger than the outer diameter of the fixing screw portion 52 of the connecting shaft 50, but to be smaller than the outer diameter of the third flange 51 of the connecting shaft 50. The upper attachment portion 412 is fixed to the second attachment surface 17a of the seat frame 17 by means of the connecting shaft 50 and the nut.

The supporting portion 413 extends from a rear end of the lower attachment portion 411 in the upper direction of the vehicle. Further, an upper end of the supporting portion 413 is connected to a front end of the upper attachment portion 412. In other words, the supporting portion 413 connects the rear end of the lower attachment portion 411 to the front end of the upper attachment portion 412 in a manner where the lower and upper attachment portions 411 and 412 are spaced away from each other in the upper-lower direction of the vehicle. The supporting portion 413 entirely connects the lower and upper attachment portions 411 and 412, each of which is formed into the substantially C shape. Therefore, the supporting portion 413 is also formed into a substantially C shape.

According to the bracket 418 of the fifth embodiment, the first load supporting point B, where the load of the seat frame 17 is supported by means of the bracket 418, is positioned at a more forward side of the vehicle than an attachment point C, where the bracket 418 is attached to the seat frame 17. Accordingly, similar effects to the first embodiment may be obtained.

Accordingly, the first load supporting point, at which the load of the seat frame 17 is supported by means of the bracket 18, 118, 218, 318 and 418 is positioned at the more forward side of the vehicle than the attachment point C, at which the seat frame 17 is attached to the bracket 18, 118, 218 318 and 418. On the other hand, according to a known seat apparatus for a vehicle, a front end of a slide rail is spot-fixed or pivotally-connected to a seat-side fixing member. In other words, a load supporting point, at which a load of the seat-side fixing member is supported by means of the slide rail, is positioned at the same point as an attachment point, at which the slide rail is attached to the seat-side fixing member. Generally, the more forward side of a vehicle a load supporting point is positioned, the fewer loads the load supporting point is applied with. In other words, according to the first to fifth embodiments, the bracket 18, 118, 218, 318 and 418, at which a spot-fixing point may be positioned according to a known configuration, receives fewer loads than the known configuration. On the other hand, the load detecting device 10, arranged at the rear portion of the vehicle seat 11, receives a larger load. As a result, even when the vehicle is driven downhill or when the occupant is seated on the front portion of the vehicle seat 11, the load of the occupant is surely detected by means of the load detecting device 10, arranged at the rear portion of the vehicle seat 11.

According to the first to fourth embodiments, the supporting portion is arranged at the lower attachment portion at a more forward side of the vehicle than an attachment point where the lower attachment portion is attached to the slide rail.

Because the upper rail 16 is arranged to be slidable relative to the vehicle floor 12 in the front-rear direction of the vehicle, a position of the front end of the upper rail 16 may be normally limited. However, the supporting portion 22, 222 and 313 is arranged at the more forward side of the vehicle than the position where the lower attachment portion 21 and 311 is attached to the upper rail 16. Therefore, the first load supporting point B, at which the load of the seat frame 17 is supported by means of the bracket 18, 118, 218 and 318, is positioned at the more forward side of the vehicle. Accordingly, the load, received by the load detecting device 10, is increased.

According to the first to fourth embodiments, the supporting portion is at least partially arranged at the more forward side of the vehicle than an end of the slide rail on the front side of the vehicle.

Accordingly, even when the position of the front end of the upper rail 16 may be limited, the first load supporting point B of the seat frame 17 by means of the bracket 18, 118, 218 and 318 is effectively positioned at a more forward side of the vehicle. Therefore, a load, received by the load detecting device 10, is further surely increased.

According to the first to third embodiments, the supporting portion is formed into a plate shape. The bracket further includes a connecting portion, arranged at the supporting portion so that an axis of the connecting portion extends orthogonally relative to a plate-shaped surface of the supporting portion, the connecting portion axially supporting the upper attachment portion.

The upper attachment portion 30 is cantilever-supported by the supporting portion 22. Therefore, when the occupant is seated on the vehicle seat 11 and the load is applied to the connecting pin 40 via the upper attachment portion 31, the load (a rotational load) is applied to the connecting pin 40 in a rotational direction about the axis of the connecting pin 40, and the rotational load is axially supported by the supporting portion 22. The axis of the connecting pin 40 extends orthogonally relative to the plate-shaped surfaces of the supporting portion 22. Therefore, the rotational load transmitted from the connecting pin 40 to the supporting portion 22 is applied tangentially relative to the surfaces of the first triangle portion 22a and the first forward extending portion 22b of the supporting portion 22. Accordingly, shear stress is applied to the supporting portion 22 to be in the rotational direction about the axis of the connecting pin 40 and to be in parallel with the surfaces of the first triangle portion 22a and the first forward extending portion 22b, and therefore, torsion force is less easily applied. Accordingly, the supporting portion 22 includes high supporting rigidity.

According to the first to third embodiments, the supporting portion is formed into a plate shape. A surface of the supporting portion extends in the front-rear direction of the vehicle and in an upper-lower direction of the vehicle.

Accordingly, when the vehicle is suddenly accelerated or decelerated and a load is applied to the vehicle seat 11 in the front-rear direction of the vehicle, the supporting portion 22 is applied mainly with shear stress, and thereby the supporting portion 22 and 222 may be deformed. The first to third embodiments and a comparative example will be compared herein. According to the comparative example, a supporting portion is formed into a plate shape, extending in a left-right direction of a vehicle and in an upper-lower direction of the vehicle. A second moment of area relative to a load, which the supporting portion 22 and 222 according to the first to third embodiments receives, is larger than a second moment of area relative to a load, which the supporting portion according to the comparative example receives. Accordingly, high flexural rigidity may be obtained according to the first to third embodiments. Further, high supporting rigidity may be obtained according to the first to third embodiments.

According to the first to third embodiments, the bracket further includes a first member having the lower attachment portion attached to the upper surface of the slide rail, and the supporting portion extending from the lower attachment portion toward the upper side of the vehicle, and thereby formed into an L-shape or a vertically inverted T shape when seen from a front direction of the vehicle, and a second member having the upper attachment portion attached to a bottom surface of the seat side-fixing member, and a vertical wall portion extending from the lower attachment portion in the upper-lower direction of the vehicle, and connected to an upper portion of the supporting portion, and thereby formed into an L-shape, a vertically inverted L shape, a T shape or a vertically inverted T shape when seen from a front direction of the vehicle.

Accordingly, a horizontal portion of the L-shaped or vertically inverted T-shaped first member 20 serves as the lower attachment portion 21 while the side wall of the L-shaped or vertically inverted T-shaped first member 20 serves as the supporting portion 22 and 222. Further, a horizontal portion of the L-shaped, vertically inverted L-shaped, T-shaped, or vertically inverted T shaped second member 30 serves as the upper attachment portion 31 while the side wall of the L-shaped, vertically inverted L-shaped, T-shaped, or vertically inverted T shaped second member 30 serves as the vertical wall portion 32 and 232. As a result, high supporting rigidity may be obtained by means of the supporting portion 22 and 222, and the vertical wall portion 32 and 232, each of which serve as the side wall.

According to the first to third embodiments, the bracket further includes a first member having the lower attachment portion, a second member having the upper attachment portion, and a stopper portion arranged at one of the first and second members, and engaging the other of the first and second members when a load separating the first member and second member relative to each other is applied.

Accordingly, when an excessive separating load is generated relative to the vehicle seat 11 (i.e. when a load separating the first and second members 20 and 30 relative to each other is applied), the stopper portion 62 and 222a restricts the first and second members 20 and 30 from being separated from each other. In other words, when the vehicle hits a front portion thereof, or when the vehicle is hit at a rear portion thereof, the vehicle seat 11 is restricted from being removed (separated) from the vehicle floor 12. Further, the bracket 18, 118 and 218 itself includes the stopper portion 62. Therefore, even when rigidity of the bracket 18, 118 and 218 may be reduced, a separation restricting force may be obtained. Accordingly, a size and a weight of the bracket 18, 118 and 218 may be reduced.

According to the first to second embodiments, the stopper portion is formed either at a first fixing member for fixing the lower attachment portion to the slide rail, or at a second fixing member for fixing the upper attachment portion to the seat-side fixing member.

Accordingly, the stopper nut 60, which fixes the bracket 18, 118 and 218 to the seat frame 17, is formed also with the stopper portion 62. Therefore, the stopper function is obtained without separately providing an additional stopper.

According to the third embodiment, the stopper portion is integrally formed at least one of the first and second members.

Accordingly, the first member 20 may integrally include the stopper portion 222a that engages with the second member 30. Alternatively, the second member 30 may integrally include the stopper portion 222a that engages with the first member 20. Furthermore, both of the first and second members 20 and 30 may integrally include the stopper portions. According to the aforementioned any cases, the stopper function may be obtained without separately providing an additional stopper.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
    a seat-side fixing member adapted to fix a seat for the vehicle;
    a slide rail adapted to be arranged so as to be slidable relative to a floor of the vehicle in a front-rear direction of the vehicle;
    a load detecting device disposed between the seat-side fixing member and the slide rail and arranged at an end portion of the slide rail on a rear side of the vehicle, the load detecting device detecting a load of an occupant seated on the seat for the vehicle; and
    a bracket arranged at an end portion of the slide rail on a front side of the vehicle, the bracket supporting the seat-side fixing member relative to the slide rail, wherein the bracket includes:
        a lower attachment portion attached to an upper surface of the slide rail,
        a supporting portion extending from the lower attachment portion toward an upper side of the vehicle,
        an upper attachment portion connected to the supporting portion so as to extend from the supporting portion toward the rear side of the vehicle, thereby being cantilever-supported by the supporting portion, and attached to the seat-side fixing member at a free-end side of the upper attachment portion,
        a first member having the lower attachment portion,
        a second member having the upper attachment portion, and
        a stopper portion arranged at one of the first and second members, and engaging the other of the first and second members when a load separating the first member and second member relative to each other is applied.

2. The seat apparatus for the vehicle according to claim 1, wherein
    the supporting portion is arranged at the lower attachment portion at a more forward side of the vehicle than an attachment point where the lower attachment portion is attached to the slide rail.

3. The seat apparatus for the vehicle according to claim 2, wherein
    the supporting portion is at least partially arranged at the more forward side of the vehicle than an end of the slide rail on the front side of the vehicle.

4. The seat apparatus for the vehicle according to claim 1, wherein
    the supporting portion is formed into a plate shape, and wherein
    the bracket further includes a connecting portion, arranged at the supporting portion so that an axis of the connecting portion extends orthogonally relative to a plate-shaped surface of the supporting portion, the connecting portion axially supporting the upper attachment portion.

5. The seat apparatus for the vehicle according to claim 2, wherein
    the supporting portion is formed into a plate shape, and wherein
    the bracket further includes a connecting portion, arranged at the supporting portion so that an axis of the connecting portion extends orthogonally relative to a plate-shaped surface of the supporting portion, the connecting portion axially supporting the upper attachment portion.

6. The seat apparatus for the vehicle according to claim 3, wherein
    the supporting portion is formed into a plate shape, and wherein
    the bracket further includes a connecting portion, arranged at the supporting portion so that an axis of the connecting portion extends orthogonally relative to a plate-shaped surface of the supporting portion, the connecting portion axially supporting the upper attachment portion.

7. The seat apparatus for the vehicle according to claim 1, wherein
    the supporting portion is formed into a plate shape, and wherein
    a surface of the supporting portion extends in the front-rear direction of the vehicle and in an upper-lower direction of the vehicle.

8. The seat apparatus for the vehicle according to claim 2, wherein
    the supporting portion is formed into a plate shape, and wherein
    a surface of the supporting portion extends in the front-rear direction of the vehicle and in an upper-lower direction of the vehicle.

9. The seat apparatus for the vehicle according to claim 3, wherein
    the supporting portion is formed into a plate shape, and wherein
    a surface of the supporting portion extends in the front-rear direction of the vehicle and in an upper-lower direction of the vehicle.

10. The seat apparatus for the vehicle according to claim 4, wherein
    the supporting portion is formed into a plate shape, and wherein
    a surface of the supporting portion extends in the front-rear direction of the vehicle and in an upper-lower direction of the vehicle.

11. The seat apparatus for the vehicle according to claim 4, wherein
    the first member has the lower attachment portion attached to the upper surface of the slide rail, and the supporting portion extending from the lower attachment portion toward the upper side of the vehicle, and thereby formed into an L-shape or a vertically inverted T shape when seen from a front direction of the vehicle, and
    the second member has the upper attachment portion attached to a bottom surface of the seat side-fixing member, and a vertical wall portion extending from the lower attachment portion in the upper-lower direction of the vehicle, and connected to an upper portion of the supporting portion , and thereby formed into an L-shape, a vertically inverted L shape, a T shape or a vertically inverted T shape when seen from a front direction of the vehicle.

12. The seat apparatus for the vehicle according to claim 7, wherein
the first member has the lower attachment portion attached to the upper surface of the slide rail, and the supporting portion extending from the lower attachment portion toward the upper side of the vehicle, and thereby formed into an L-shape or a vertically inverted T shape when seen from a front direction of the vehicle, and
the second member has the upper attachment portion attached to a bottom surface of the seat side-fixing member, and a vertical wall portion extending from the lower attachment portion in the upper-lower direction of the vehicle, and connected to an upper portion of the supporting portion , and thereby formed into an L-shape, a vertically inverted L shape, a T shape or a vertically inverted T shape when seen from a front direction of the vehicle.

13. The seat apparatus for the vehicle according to claim 1, wherein
the stopper portion is formed either at a first fixing member for fixing the lower attachment portion to the slide rail, or at a second fixing member for fixing the upper attachment portion to the seat-side fixing member.

14. The seat apparatus for the vehicle according to claim 1, wherein
the stopper portion is integrally formed at least one of the first and second members.

* * * * *